United States Patent [19]

McGlashen et al.

[11] Patent Number: 4,618,466
[45] Date of Patent: Oct. 21, 1986

[54] MOULDING APPARATUS

[75] Inventors: James N. McGlashen, Winstanley; Colin Holroyd, Southport, both of England

[73] Assignee: Apsley Metals Limited, England

[21] Appl. No.: 536,400

[22] Filed: Sep. 27, 1983

[30] Foreign Application Priority Data

Oct. 21, 1982 [GB] United Kingdom ............... 8230139

[51] Int. Cl.⁴ ..................... B29C 45/14; B29C 45/78; B29C 45/80
[52] U.S. Cl. ................................ 264/40.6; 264/267; 264/328.2; 264/328.7; 264/328.9; 264/328.11; 264/336; 425/117; 425/129 R; 425/143
[58] Field of Search .......... 425/110, 117, 127, 129 R, 425/812, 554, 556, 190, 193, 195, 555, 806, 143; 264/2.2, 276, 335, 328.11, 328.7, 328.9, 267, 336, 328.2; 249/82

[56] References Cited

U.S. PATENT DOCUMENTS

| 2,582,260 | 1/1952 | Kutik | 425/550 |
|---|---|---|---|
| 2,963,743 | 12/1960 | Kraft | 425/193 |
| 3,108,339 | 10/1963 | Bucy | 425/812 |
| 3,194,868 | 7/1965 | Shaw | 264/328.2 |
| 3,357,072 | 12/1967 | Sutphin | 425/812 |
| 3,743,455 | 7/1973 | Green | 425/812 |
| 3,754,846 | 8/1973 | Choate | 425/812 |
| 3,773,454 | 11/1973 | Horve et al. | 425/129 R |
| 3,787,159 | 1/1974 | Bielfeldt | 425/150 |
| 3,972,978 | 8/1976 | Caretta | 264/334 |
| 4,075,275 | 2/1978 | Nishamura et al. | 264/326 |
| 4,168,193 | 9/1979 | Brunet et al. | 156/131 |
| 4,181,482 | 1/1980 | Grawey et al. | 425/554 |
| 4,257,994 | 3/1981 | Leblanc et al. | 425/117 |
| 4,370,123 | 1/1983 | Daniels et al. | 264/328.7 |

FOREIGN PATENT DOCUMENTS

| 887263 | 9/1953 | Fed. Rep. of Germany . |
|---|---|---|
| 1127579 | 4/1962 | Fed. Rep. of Germany . |
| 1202966 | 10/1965 | Fed. Rep. of Germany . |
| 2201527 | 8/1973 | Fed. Rep. of Germany . |
| 890639 | 3/1962 | United Kingdom . |
| 1034336 | 6/1966 | United Kingdom ................. 425/88 |

Primary Examiner—Willard E. Hoag
Attorney, Agent, or Firm—Stevens, Davis, Miller & Mosher

[57] ABSTRACT

A moulding apparatus and a method of moulding for components of unvulcanized elastomeric material which forms a spew free component and provides for handling the component for subsequent use. The apparatus as shown in the Figures comprises a first mould member having a mould cavity for part of the component and a feed port for material and a second complementary mould member which includes a detachable component carrying insert. The two mould members and are relatively movable to provide two different volumes for the mould cavity, the change to the smaller volume being used to return some material through the feed port and to complete moulding of the component.

7 Claims, 4 Drawing Figures

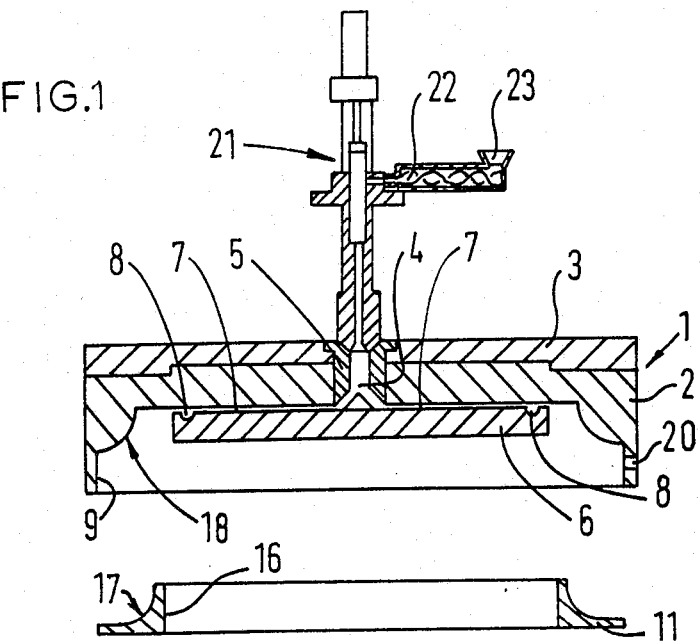
FIG.1
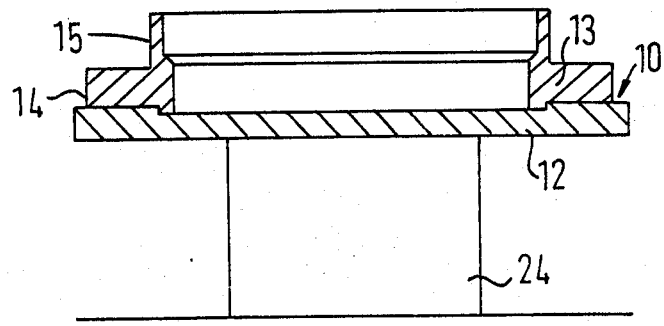

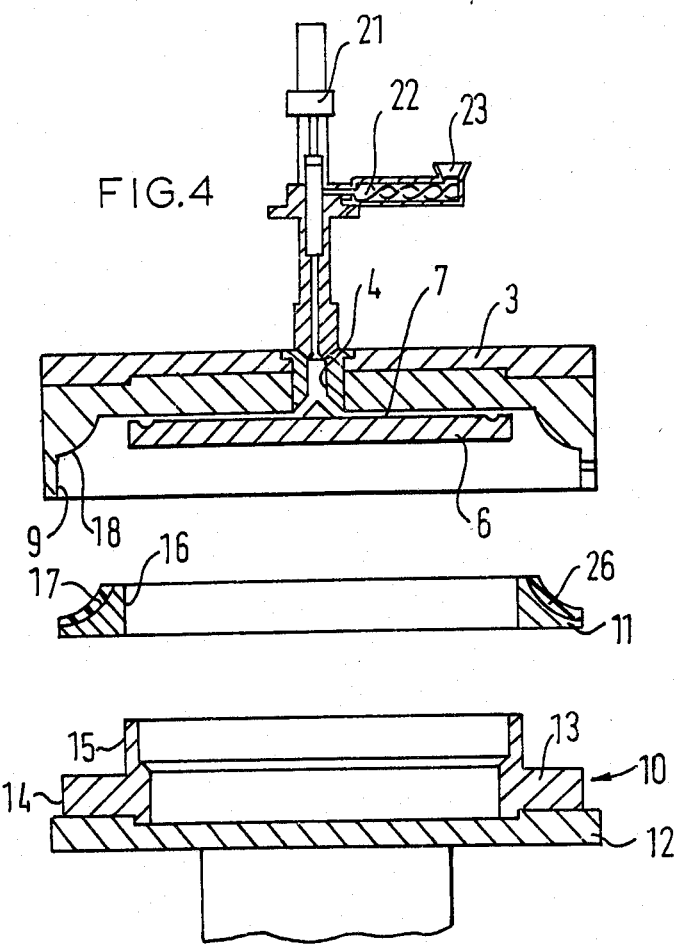

MOULDING APPARATUS

This invention relates to moulding apparatus and a method of moulding for discrete components of unvulcanised elastomeric material such as may be used, for example, as components for a vehicle tire.

Difficulties arise in moulding unvulcanised elastomeric material due to the need to prevent undue heating so that vulcanisation is not begun and to produce accurate components without the need for removing spew or pips and the consequent problems of material wastage or the difficulties and cost of recycling material. Elastomeric material has a nerve or memory which needs to be overcome to give accurate components and thus straightforward extrusion or moulding of components is invariably unsuccessful as the component does not retain the die or mould shape. Furthermore components of unvulcanised elastomeric material are weak and difficult to handle without deformation.

It is an object of the present invention to provide a moulding system which avoids these difficulties.

According to one aspect of the present invention a moulding apparatus for a component of unvulcanised elastomeric material comprises a first mould member having a mould cavity shaped to form part of the component and a feed port for elastomeric material, a second mould member characterised in that the second mould member is in sliding engagement with the first mould member, the second mould member comprising a detachable component carrying insert, the sliding engagement defines a second mould cavity complementary to the first mould cavity and means for relatively sliding the first and second mould members so as to provide two different volumes of the closed mould cavity formed by said first and second mould cavities such that the change to the smaller volume may be made after filling the cavity with elastomeric material so as to return some elastomeric material into the feed port for subsequent use.

Preferably a mould exhaust port is provided which is attachable to a sub-atmospheric pressure chamber so that air may be drawn from the mould cavity to assist effective mould filling and prevent air entrapment. The exhaust port may have valve means either comprising a valve associated with an exhaust passage or a sliding valve effected by the sliding engagement of said first and second mould members.

The first and second mould members may have a cylindrical inter-engagement at the sliding engagement point in the manner of a piston in a cylinder bore and the relative sliding may be by means of a hydraulically powered press.

Another aspect of the invention provides a method of moulding components of unvulcanised elastomeric material comprising pushing elastomeric material through a feed port to fill a mould cavity formed between two slidably engaged mould members one of which includes a component carrying insert with elastomeric material, stopping feed of material, sliding together the mould members so as to reduce the mould cavity volume to the final component shape and push excess material back into the feed port, separating the mould and removing the component from the mould carried on the insert.

The method preferably includes the step of fitting a component carrying insert to the second mould member prior to assembling together the first and second mould members for subsequently removing the component support and carried upon the insert.

Preferably a sub-atmospheric pressure chamber is connected to the mould cavity to assist filling the mould with elastomeric material.

Further aspects of the present invention will be apparent from the following description, by way of example only, of one embodiment in conjunction with the attached diagrammatic drawings in which:

FIG. 1 is a cross-section of a moulding apparatus before closing;

FIG. 4 shows the moulding apparatus of FIG. 1 in the component ejection stage.

Figure 2:
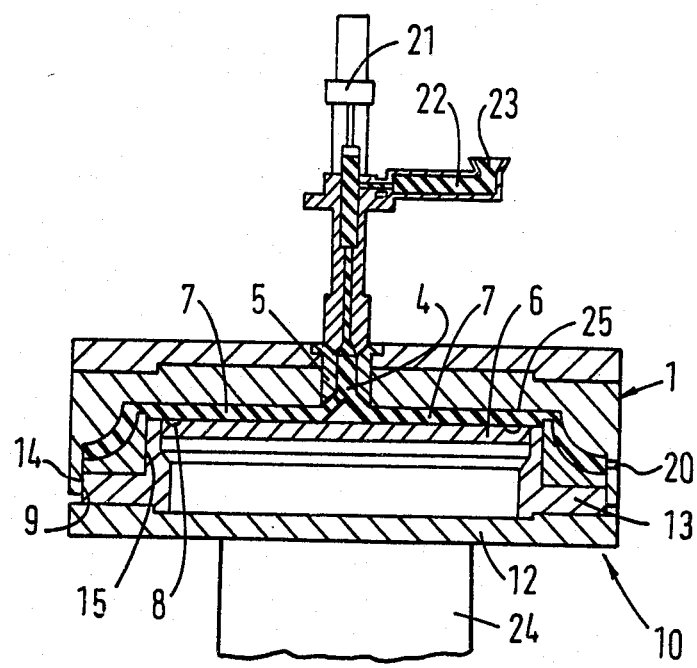
FIG. 2 shows the moulding apparatus of FIG. 1 in the first mould filling stage.

The moulding apparatus shown is intended to mould a ring of elastomeric material having the cross-sectional shape of a letter "C". An upper or first mould member 1 comprises a steel mould disc 2 which has a disc-shaped top plate 3 fastened to it and a central, axially-directed feed port 4 which is machined through a bush 5 fitted in the top plate 3. A material deflector plate 6, which again comprises a disc of steel is attached to the mould disc 2 as shown and a set of narrow radial feed ports 7 is provided in the top surface of the deflector plate 6 to distribute the material to be moulded around the mould disc 2. A collector groove 8 to balance the feed pressure of the material is formed near the edge of the deflector plate 6 and extends completely around the edge of the deflector plate. The bottom of the mould disc 2 has a cylindrical bore 9 machined as shown to cooperate with a second mould member 10 and an associated insert 11 now to be described.

Figure 3:
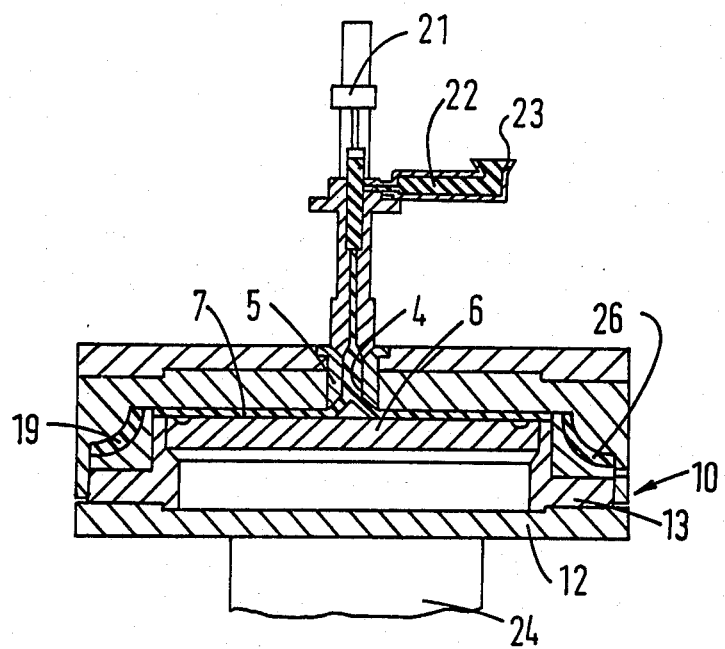
FIG. 3 shows the moulding apparatus of FIG. 1 in the final moulding stage.

The second mould member 10 comprises a solid steel disc base member 12 and a ring shaped engagement member 13 mounted upon the base member. The engagement member 13 has a machined outer cylindrical surface 14 which is a close fit to the cylindrical bore 9 in the top mould member 1. This fit is such that relative sliding of the first and second mould members 1 and 10 may be provided at this piston and cylinder-like interface. A second cylindrical surface 15 is provided at the top of the engagement member 13 which locates and engages a complementary cylindrical bore 16 in the insert 11. As can be seen in FIG. 3 the insert 11 is engageable upon the engagement member 13 and the sub assembly then forms the second part of the cavity mould with the upper curved surface 17 of the insert and the lower curved surface 18 on the first mould member disc 2 providing the component cavity 19.

The upper mould member 1 also has provided a vacuum port 20 which extends through the cylindrical bore 9 adjacent to the closed mould cavity.

The mould is filled by means of a ram extruder 21 which is fed by a screw extruder 22 filled from a material supply hopper 23.

Finally it should be noted that the entire lower or second mould member assembly 10 is mounted upon the piston 24 of a hydraulic press which provides for sliding the two mould members together to form the finished component cavity of FIG. 3 as well as a preliminary cavity filling volume of FIG. 2 as will be described.

The operation of the apparatus comprises firstly opening the press and placing the insert 11 between the first and second mould members 1 and 10 as shown in FIG. 1. The press is then closed by raising the piston 24 so that the insert 11 is engaged by the engagement member 13 and then the sub assembly thereformed engages the first mould member 1 at the cylindrical surfaces 9 and 14 to give the position shown in FIG. 2. Note that an opening 25 is left between the top of the insert 11 and the lower surface of the disc 2.

A source of vacuum is connected to the vacuum port 20 to evacuate the mould.

Uncured elastomeric material, put into the hopper 23 is propelled by the screw feed extruder 22 to charge the ram extruder 21 which pushes a volume of material through the feed ports 4 and 7 and the collector groove 8 into the cavity in the mould. The lower or second mould assembly 10 is then raised to the position of FIG. 3 which cuts off the vacuum port 20 and closes the mould cavity 19 cutting off the opening 25 and completing the shape of the component 26 required. This closing step returns excess elastomeric material and produces a flash and spew-free component.

Finally the press is opened and the component 26 is removed, carried upon the insert 11 as shown in FIG. 4.

It is important to note that the mould is not heated to vulcanising temperature but it may be provided with controlled heating means to ensure vulcanisation of the components is not begun. The change of volume of the component produces reversed flow in the mould cavity which is particularly effective in completely filling the mould with the elastomeric material in the condition of its memory being overcome so that the component shape remains that of the mould cavity.

The component is removed on the carrying insert which overcomes the difficulty of handling a component of uncured elastomeric material without distorting the component. Subsequent moulding operations are carried out using further carrying rings in turn.

The component is produced spew and flush free and the material pushed backwards into the feed ports is used for the next component.

We claim:

1. Moulding apparatus for moulding a component of unvulcanized elastomeric material, comprising in operable combination:
    (a) first and second mould members defining a moulding cavity, the two members being slidably movable relative to each other to change the volume of the cavity from a first, larger value to a second, smaller value;
    (b) a feed port formed in the first mould member through which elastomeric material to be moulded is fed to fill the cavity having the first, larger value of volume;
    (c) means to relatively move the members to change the volume of the cavity to the second, smaller value, thereby pushing some material back into the feed port, the material remaining in the cavity becoming the moulded component; and
    (d) a detachable component carrying insert positionable within the moulding cavity and carried by the second moulding member and positioned to be contacted by elastomeric material admitted into the moulding cavity from the feed port by means of which insert the moulded component of unvulcanized elastomeric material, while attached to the insert, may be removed from the cavity when the first and second mould members are separated.

2. Moulding apparatus according to claim 1 wherein a mould exhaust port is provided through one of the mould members, the exhaust port being attachable to a sub-atmospheric pressure chamber and the exhaust port having closure means to allow closing of said port before the cavity is filled with elastomeric material.

3. Moulding apparatus according to claim 2 wherein the closure means comprises slide valve means operated by the relative sliding of the first and second mould members.

4. Moulding apparatus according to claim 1 wherein the first and second mould members have a cylindrical bore and complementary cylindrical outer surface so that the sliding engagement comprises a cylinder and piston assembly.

5. A method of moulding components of unvulcanized elastomeric material, comprising the steps of:
    (a) feeding flowable unvulcanized elastomeric material through a feed port to fill a mould cavity defined by first and second slidably engaged mould members, said cavity having a volume of a first, larger value;
    (b) stopping the feeding of material when the cavity is full;
    (c) slidably relatively moving together the mould members so as to change the volume of the cavity to a second, smaller value, thereby pushing some material back into the feed port, the material remaining in the cavity becoming the moulded component;
    (d) separating the mould members when the moulded component is non-flowable; and
    (e) controlling the mould cavity temperature to avoid vulcanization of the elastomeric material;
    (f) removing the component which is in an unvulcanized state from the mould by means of a detachable component carrying insert which is initially carried by the second mould member.

6. A method according to claim 5, including fitting the detachable component carrying insert to the second mould member prior to assembling together the first and second mould members and taking the moulded component from the mould while supported upon said insert.

7. A method according to claim 5, including subjecting the cavity to sub-atmospheric pressure prior to filing the cavity with unvulcanized elastomeric material.

* * * * *